United States Patent
Takezawa et al.

(10) Patent No.: US 9,590,490 B2
(45) Date of Patent: Mar. 7, 2017

(54) INRUSH CURRENT SUPPRESSION CIRCUIT

(71) Applicant: Mitsubishi Electric Corporation, Tokyo (JP)

(72) Inventors: Ryuichi Takezawa, Tokyo (JP); Kotaro Ono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/758,303

(22) PCT Filed: May 22, 2014

(86) PCT No.: PCT/JP2014/063572
§ 371 (c)(1),
(2) Date: Jun. 29, 2015

(87) PCT Pub. No.: WO2015/177903
PCT Pub. Date: Nov. 26, 2015

(65) Prior Publication Data
US 2016/0254740 A1    Sep. 1, 2016

(51) Int. Cl.
*H02M 1/32* (2007.01)
*H02H 9/00* (2006.01)
(Continued)

(52) U.S. Cl.
CPC ........... *H02M 1/32* (2013.01); *H01H 47/22* (2013.01); *H02H 9/002* (2013.01); *H02M 7/537* (2013.01)

(58) Field of Classification Search
CPC ............ H02M 1/32; H02M 1/34; H02M 1/38; H02M 7/48; H02M 7/122; H02M 7/538; H01H 47/22
(Continued)

(56) References Cited

U.S. PATENT DOCUMENTS

2011/0248564 A1* 10/2011 Hida ................. H02M 7/48
307/31
2015/0222207 A1* 8/2015 Matsushita ............. B66F 9/02
318/376

FOREIGN PATENT DOCUMENTS

JP    3-297019 A    12/1991
JP    6-38359 A    2/1994
(Continued)

OTHER PUBLICATIONS

Written Opinion for PCT/JP2014/063572 dated Aug. 5, 2014 [PCT/ISA/237].

*Primary Examiner* — Yemane Mehari
(74) *Attorney, Agent, or Firm* — Sughrue Mion, PLLC; Richard C. Turner

(57) ABSTRACT

The present invention provides an inrush current suppression circuit that is provided in an electric power conversion apparatus and suppresses inrush current that occurs when power is turned on, the electric power conversion apparatus including an inverter circuit and a drive power circuit that generates direct voltages of two levels as drive voltages, wherein the inrush current suppression circuit includes: an inrush current prevention resistor disposed between a converter circuit that generates DC power to be supplied to the inverter circuit and a smoothing circuit; a relay connected in parallel to the inrush current prevention resistor; and a relay control circuit that applies to the relay a higher direct voltage to shift the relay to a closed state, and after the relay is set to the closed state, applies to the relay a lower direct voltage to retain the closed state.

6 Claims, 3 Drawing Sheets

(51) Int. Cl.
*H01H 47/22* (2006.01)
*H02M 7/537* (2006.01)

(58) Field of Classification Search
USPC .......................................... 363/56.01–56.12
See application file for complete search history.

(56) References Cited

FOREIGN PATENT DOCUMENTS

| JP | 7-298402 A | | 11/1995 |
|---|---|---|---|
| JP | 2002-271989 A | | 9/2002 |
| JP | 2006-50865 A | | 2/2006 |
| JP | 2008-186645 A | | 8/2008 |
| JP | 2009-11042 A | | 1/2009 |
| JP | 2009011042 A | * | 1/2009 |
| JP | 2011-199940 A | | 10/2011 |

* cited by examiner

INRUSH CURRENT SUPPRESSION CIRCUIT

CROSS REFERENCE TO RELATED APPLICATIONS

This application is a National Stage of International Application No. PCT/JP2014/063572, filed on May 22, 2014, the contents of all of which are incorporated herein by reference in their entirety.

FIELD

The present invention relates to an inrush current suppression circuit that suppresses inrush current supplied to an inverter.

BACKGROUND

Conventional general-purpose inverters are provided with an inrush current suppression resistor to prevent a large current (inrush current) from flowing to an electrolytic capacitor provided in the main circuit when the power is turned on. During the operation other than when the power is turned on, a relay connected in parallel to the inrush current suppression resistor operates so as to preclude current from flowing to the inrush current suppression resistor to thereby suppress a loss. Further mechanism is arranged such that the relay is disconnected when an alarm is generated, so that the inverter is isolated from three-phase alternating current and damage is suppressed. Here, the relay is placed at a position where current flows most in the inverter and, thus, the temperature of the relay becomes very high. Hence, it is important to suppress the rise of temperature of the relay.

For example, there is a technique in which a certain voltage is applied to the coil of a relay to attract the relay and, then, the voltage applied to the coil is controlled to be lowered to a range within which the attracted state can be retained, so that the rise of temperature is suppressed (for example, Patent Literatures 1 and 2).

CITATION LIST

Patent Literature

Patent Literature 1: Japanese Patent Application Laid-Open No. H06-38359
Patent Literature 2: Japanese Patent Application Laid-Open No. 2008-186645

SUMMARY

Technical Problem

In the drive circuit of a power relay described in Patent Literature 1, a rated voltage is applied to the coil of the relay to attract the relay, and after the attraction is made, a voltage resulting from division of the rated voltage is applied to the coil to retain the attracted state, to thereby suppress the rise of temperature. However, since a voltage-dividing resistor is used in a circuit for dividing the rated voltage, there is a problem in that a loss is caused in the voltage-dividing resistor.

An electromagnetic relay drive device described in Patent Literature 2 has a problem in that, in addition to a power source to generate a voltage for attracting the relay, another power source is needed to generate a voltage for retaining the attracted state, which leads to an increase in the number of circuits and in cost.

The present invention has been achieved in view of the above, and an object of the present invention is to provide an inrush current suppression circuit that is capable of preventing a generation of losses and a rise of temperature while suppressing the increase in cost.

Solution to Problem

In order to solve the aforementioned problems, an inrush current suppression circuit according to one aspect of the present invention, which is provided in an electric power conversion apparatus and suppresses inrush current that occurs when power is turned on, wherein the electric power conversion apparatus includes an inverter circuit and a drive power circuit that generates direct voltages of two levels as drive voltages to be applied to a drive circuit of switching elements included in the inverter circuit, is constructed in such a manner as to include: an inrush current prevention resistor disposed between a converter circuit that generates DC power to be supplied to the inverter circuit and a smoothing circuit; a relay connected in parallel to the inrush current prevention resistor; and a relay control circuit that applies to the relay a higher direct voltage out of the direct voltages of the two levels to shift the relay to a closed state, and after the relay is set to the closed state, applies to the relay a lower direct voltage out of the direct voltages of the two levels to retain the closed state.

Advantageous Effects of Invention

The present invention achieves an effect of providing, with low costs, an inrush current suppression circuit that is capable of suppressing losses in a circuit.

DESCRIPTION OF EMBODIMENTS

Exemplary embodiments of an inrush current suppression circuit according to the present invention will now be described in detail with reference to the drawings. The present invention is not limited to the embodiments.

Embodiment

Figure 1:
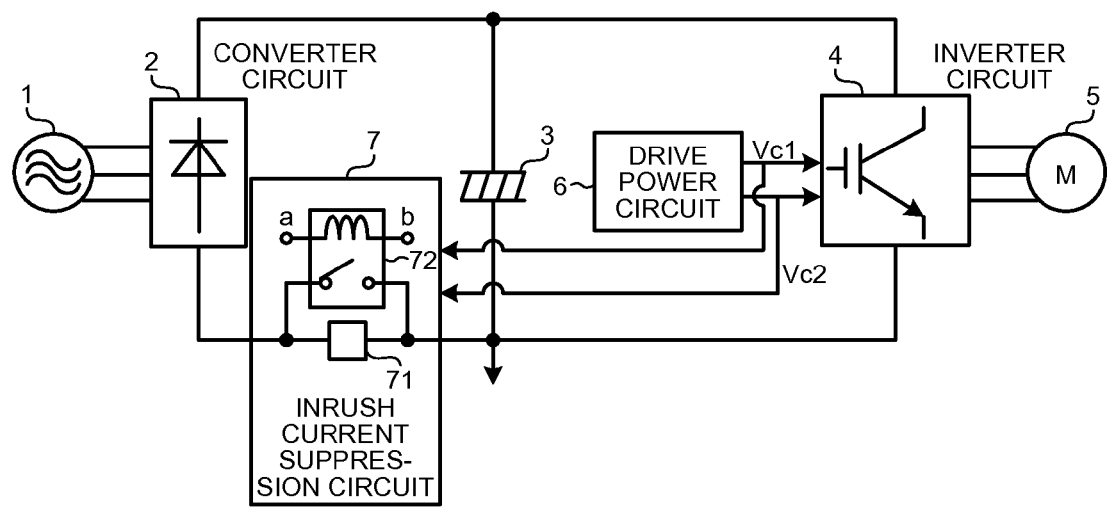
FIG. 1 is a diagram of an exemplary configuration of an electric power conversion apparatus including an inrush current suppression circuit according to the present invention.

FIG. 1 is a diagram of an exemplary configuration of an electric power conversion apparatus including an inrush current suppression circuit according to the present invention.

The electric power conversion apparatus illustrated in FIG. 1 receives power from an AC power source 1 and generates alternating voltage for driving a motor 5. As illustrated, the electric power conversion apparatus includes a converter circuit 2 that rectifies the alternating voltage supplied from the AC power source 1 to generate direct voltage, a capacitor 3 that smooths the direct voltage generated by the converter circuit 2, an inverter circuit 4 that converts the direct voltage smoothed by the capacitor 3 to generate alternating voltage for driving the motor 5, a drive power circuit 6 that generates drive voltages to be applied to the gate of each of switching elements included in the inverter circuit 4, and an inrush current suppression circuit 7 that is disposed between the converter circuit 2 and the capacitor 3 to suppress current (inrush current) that flows into the capacitor 3 when the electric power conversion apparatus is activated. The inrush current suppression circuit 7 is disposed on the negative electrode (N) side and includes an inrush current suppression resistor 71 and a relay 72 connected in parallel to the inrush current suppression resistor 71. In the present embodiment, the switching elements included in the inverter circuit 4 are IGBTs (Insulated Gate Bipolar Transistors).

Although detailed illustration is omitted in FIG. 1, voltage applied across the relay 72 (at a terminal a and a terminal b) is supplied from the drive power circuit 6. In this configuration, drive voltages Vc1 and Vc2 supplied from the drive power circuit 6 to the inverter circuit 4 are also supplied to the relay 72. The drive voltages Vc1 and Vc2 are constant voltages, and a control circuit that performs control in the inverter circuit 4 generates signals (drive signals), which are to be applied respectively to the gates for driving the switching elements, from the drive voltages Vc1 and Vc2.

Although illustration is omitted in FIG. 1, the electric power conversion apparatus is provided with a function of protecting the inverter circuit 4, so that, when an abnormality is detected, an alarm is generated and the protection function is activated.

Figure 2:
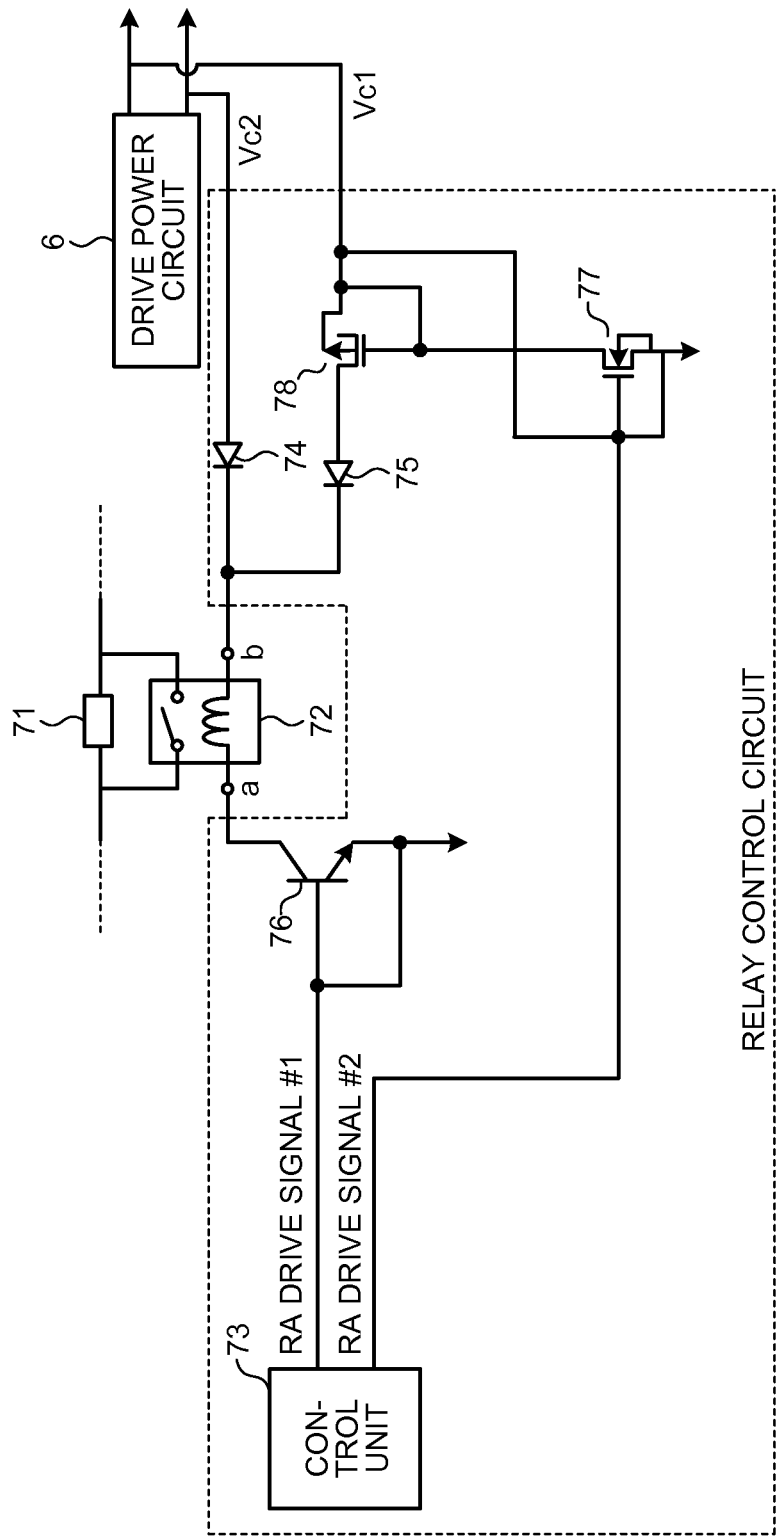
FIG. 2 is a diagram of an exemplary configuration of the inrush current suppression circuit.

FIG. 2 is a diagram of an exemplary configuration of the inrush current suppression circuit 7. For the convenience of explanation, the drive power circuit 6 is also illustrated in FIG. 2.

The inrush current suppression circuit 7 includes the inrush current suppression resistor 71, the relay 72, a control unit 73, diodes 74 and 75, and transistors 76, 77, and 78.

The inrush current suppression resistor 71 is connected at one end to the negative electrode side terminal of the converter circuit 2 and at the other end to the negative electrode side terminal of the capacitor 3 (see FIG. 1). The relay 72 is connected in parallel to the inrush current suppression resistor 71 and, when a certain voltage is applied to its internal coil, the relay is attracted (toward the coil) to short-circuit the (both) ends of the inrush current suppression resistor 71. The control unit 73 controls the transistors 76 and 77 to switch the voltages to be applied to the relay 72. The diode 74 is disposed between the drive power circuit 6 and the relay 72 to prevent the current from flowing backward to the drive power circuit 6. The drive voltage Vc2 from the drive power circuit 6 is applied to the anode of the diode 74. The diode 75 is disposed between the transistor 78 and the terminal b of the relay 72 to prevent the current from flowing backward to the transistor 78. The transistor 76 is an NPN-type transistor with its collector connected to the terminal a of the relay 72 and its emitter grounded. An RA drive signal #1 output from the control unit 73 is input to the base of the transistor 76. The transistor 77 is an N-type FET (Field Effect Transistor) with its drain connected to the gate of the transistor 78 and its source grounded. An RA drive signal #2 output from the control unit 73 is input to the gate of the transistor 77. The transistor 78 is a P-type FET, and the drive voltage Vc1 from the drive power circuit 6 is applied to the source of the transistor 78. The drain of the transistor 78 is connected to the anode of the diode 75 and the gate of the transistor 78 is connected to the drain of the transistor 77.

A circuit including the control unit 73, the diodes 74 and 75, and the transistors 76, 77, and 78 is referred to as a relay control circuit hereinafter.

Figure 3:
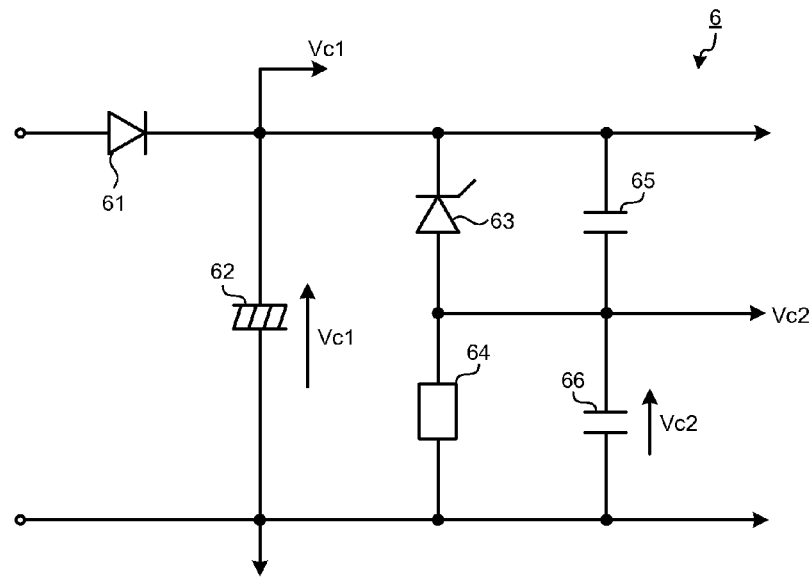
FIG. 3 is a diagram of an exemplary configuration of a drive power circuit.

FIG. 3 is an exemplary configuration of the drive power circuit 6. The drive power circuit 6 includes a diode 61, capacitors 62, 65, and 66, a Zener diode 63, and a resistor 64.

The diode 61 and the capacitor 62 form a rectifier circuit and convert alternating voltage supplied from an undepicted external AC power source to generate a direct voltage. The direct voltage generated is, for example, 30 V, and supplied to the inverter circuit 4 and the inrush current suppression circuit 7 as the drive voltage Vc1.

The Zener diode 63, the resistor 64, and the capacitors 65 and 66 form a voltage-dividing circuit to divide the direct voltage generated by the diode 61 and the capacitor 62. A direct voltage resulting from the voltage division, in other words, the voltage across the capacitor 66, is supplied to the inverter circuit 4 and the inrush current suppression circuit 7 as the drive voltage Vc2.

Figure 4:
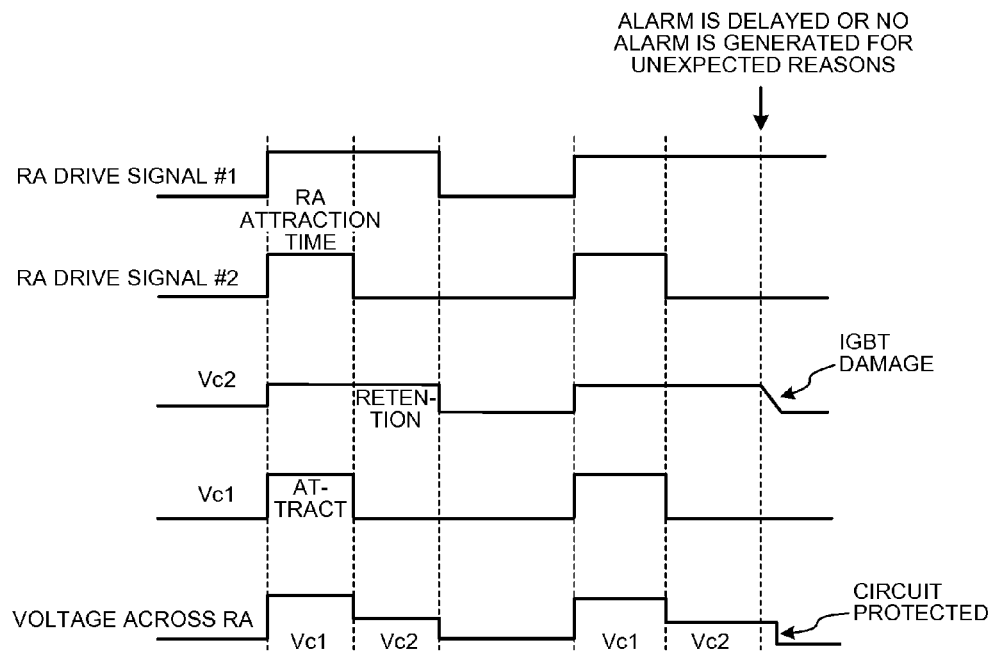
FIG. 4 is a time chart illustrating an example operation of the inrush current suppression circuit.

The operation of the inrush current suppression circuit 7 in the electric power conversion apparatus according to the present embodiment will now be described with reference to FIGS. 1 to 4. FIG. 4 is a time chart illustrating an example operation of the inrush current suppression circuit 7. In FIG. 4, the RA drive signal #1 and the RA drive signal #2 output by the control unit 73, the voltage(s) applied to the relay 72 (whether or not the drive voltages Vc1 and Vc2 are applied), and the voltage across the relay 72 are illustrated.

When the AC power source 1 is turned on to start supplying alternating voltage, the electric power conversion apparatus is activated, and inrush current flowing from the converter circuit 2 to the capacitor 3. Hence, the control unit 73 in the relay control circuit sets the RA drive signals #1 and #2 to an L (Low) level at a point in time when the supply of the alternating voltage to the converter circuit 2 is started, and the relay 72 is kept open. As a result, the inrush current is suppressed due to the function of the inrush current suppression resistor 71. When a certain period of time elapses from the start of the electric power conversion apparatus, the control unit 73 sets the RA drive signals #1 and #2 to an H (High) level. When the RA drive signals #1 and #2 are set to an H level, the transistor (hereinafter referred to as TR) 76 and the TR 77 are turned on, and accordingly the TR 78 is turned on. As a result, the drive voltages Vc1 and Vc2 from the drive power circuit 6 are applied to the relay 72. The voltage across the relay 72 (voltage across RA) becomes Vc1 at this point in time, which attracts the relay 72 (sets the relay 72 to a closed state). When the relay 72 is closed, the current is precluded from flowing through the inrush current suppression resistor 71, and a loss caused at the inrush current suppression resistor 71 can be avoided.

When the relay 72 is closed, in other words, when RA attraction time (a period of time needed for the relay 72 to get into a closed state) elapses from the time at which the RA drive signals #1 and #2 are set to an H level, the control unit 73 sets the RA drive signal #2 to an L level while keeping the RA drive signal #1 at an H level. Due to this, the TR 77 is set to off and the TR 78 is also set to off. As a result, only the drive voltage Vc2 from the drive power circuit 6 is applied to the relay 72, which causes the voltage across the relay 72 to become Vc2. The drive voltage Vc2, which is a voltage higher than the retention voltage for the relay 72, retains the closes state of the relay 72. Hence, no current flows through the inrush current suppression resistor 71, and thereby no loss is generated at the inrush current suppression resistor 71. Additionally, since the drive voltage Vc2 is a voltage lower than the drive voltage Vc1, the amount of heat generated at the relay 72 can be suppressed and the loss caused at the relay 72 can be suppressed. Furthermore, since the drive voltages of the two levels supplied by the drive power circuit 6 to the inverter circuit 4 are used to generate the voltage to be applied to the relay 72, no other circuit for generating the voltage to be applied to the relay 72 is required, which can suppress an increase in cost.

When the supply of the voltage from the AC power source 1 is stopped, the control unit 73 sets the RA drive signals #1 and #2 to an L level. As a result, the application voltage applied to the relay 72 becomes 0 V, which sets the relay 72 to an open state.

Subsequently, when the electric power conversion apparatus is started again, the control unit 73 sets the RA drive signals #1 and #2 to an H level and, after the elapse of the RA attraction time, sets the RA drive signal #2 to an L level, so that the relay 72 is led to the closed state (the application voltage to the relay 72 is Vc2). If, in this situation, the drive power circuit 6 is damaged, etc. for some reason and it causes the output of the drive voltages Vc1 and Vc2 to be stopped, the drive voltages Vc1 and Vc2 supplied to the inrush current suppression circuit 7 also become 0 V. Then, the voltage applied to the relay 72 also becomes 0 V, which blocks the connection of the relay 72 and the relay 72 is set to be in an open state. As a result, the inverter circuit 4 can be protected. If, for example, an IGBT included in the inverter circuit 4 is damaged, the drive power circuit 6 is also damaged in some cases. In such a case, the output of the drive voltages Vc1 and Vc2 is also stopped, which causes the voltage to be applied to the relay 72 to become 0 V and thus the relay 72 is disconnected and set to an open state. By setting the relay 72 to be in the open state, the inverter circuit 4 is protected, which can prevent the inverter circuit 4 from being further damaged.

Although, as described above, the electric power conversion apparatus is provided with a protection function for the inverter circuit 4, and accordingly, when an abnormality is detected, an alarm is generated and the protection function is activated, there is potentially a case in which the protection function is not activated or the generation of the alarm is delayed for unexpected reasons, such as the failure of a protection circuit itself to execute the protection function. In the present embodiment, even if the protection function is not activated when the drive power circuit 6 is damaged, the inverter circuit 4 can be protected by opening the relay 72, which thereby achieves increased reliability of the system.

In the manner described, in the electric power conversion apparatus according to the present embodiment, the inrush current suppression circuit 7 is configured to control the relay 72 connected in parallel to the inrush current suppression resistor 71 by using the drive voltages generated by the drive power circuit 6 for supplying to the inverter circuit 4. Additionally, after the relay 72 is set to the closes state, the inrush current suppression circuit 7 is configured to apply to the relay 72 a voltage lower than the voltage applied for the attraction of the relay 72 to retain the closes state of the relay 72. This provides the capability of suppressing the amount of loss at the relay 72 while suppressing an increase in cost. Furthermore, this provides the capability of preventing the temperature from rising and achieving the stability of the operation.

Moreover, since the inrush current suppression circuit 7 is disposed on the N side, the need for designing in consideration of insulation distance is eliminated.

INDUSTRIAL APPLICABILITY

As described above, the inrush current suppression circuit according to the present invention is useful for an electric power conversion apparatus and, in particular, suitable to an invention for suppressing inrush current that occurs when the electric power conversion apparatus is started.

REFERENCE SIGNS LIST

1 AC power source
2 converter circuit
3, 62, 65, and 66 capacitor
4 inverter circuit
5 motor
6 drive power circuit
7 inrush current suppression circuit
61, 74, and 75 diode
63 Zener diode
64 resistor
71 inrush current suppression resistor
72 relay
73 control unit
76, 77, and 78 transistor.

The invention claimed is:

1. An inrush current suppression circuit that is provided in an electric power conversion apparatus and suppresses inrush current that occurs when power is turned on, the electric power conversion apparatus including an inverter circuit and a drive power circuit that generates direct voltages of two levels as drive voltages to be applied to a gate of each of switching elements included in the inverter circuit, wherein the inrush current suppression circuit comprises:
  an inrush current prevention resistor disposed between a converter circuit that generates DC voltage to be supplied to the inverter circuit and a smoothing capacitor;
  a relay connected in parallel to the inrush current prevention resistor; and
  a relay control circuit that applies to the relay a higher direct voltage between the direct voltages of the two levels when the relay control circuit shifts a state of the relay from an open state to a closed state, and after the relay is set to the closed state, applies to the relay a lower direct voltage between the direct voltages of the two levels when the relay control circuit maintains the closed state.

2. The inrush current suppression circuit according to claim 1, wherein the switching elements are insulated gate bipolar transistors (IGBTs).

3. The inrush current suppression circuit according to claim 1, wherein the inrush current suppression circuit is disposed on a negative electrode side of the converter circuit.

4. The inrush current suppression circuit according to claim 1, wherein the relay comprises an internal coil and a switch,
  wherein the inrush current suppression circuit further comprises a first connection line and a second connection line that respectively connect the drive power circuit to the internal coil, and
  wherein the drive power circuit applies the higher direct voltage to the coil through the first connection line to change the state of the switch from the open state to the closed state, and applies the lower direct voltage to the internal coil to maintain the closed state.

5. The inrush current suppression circuit according to claim 4, wherein the internal coil comprises a first terminal and a second terminal, wherein the first connection line and the second connection line are connected to the second terminal of the internal coil, wherein the relay control circuit generates a first drive signal that turns on a first switching element connecting the first terminal of the internal coil to ground while the closed state is maintained, and generates a second drive signal that turns on a second switching element that is a serial part of the first connection line when the open state is changed to the closed state.

6. An inrush current suppression circuit that is provided in an electric power conversion apparatus and suppresses inrush current that occurs when power is turned on, the electric power conversion apparatus including an inverter circuit, wherein the inrush current suppression circuit comprises:

an inrush current prevention resistor disposed between a converter circuit that generates DC voltage to be supplied to the inverter circuit and a smoothing capacitor;

a relay connected in parallel to the inrush current prevention resistor; and a relay control circuit that applies to the relay a higher direct voltage when the relay control circuit shifts a state of the relay from an open state to a closed state, and after the relay is set to the closed state, applies to the relay a lower direct voltage when the relay control circuit maintains the closed state.

* * * * *